(12) United States Patent
Laursen et al.

(10) Patent No.: US 12,055,426 B2
(45) Date of Patent: Aug. 6, 2024

(54) FLOW METER WITH FLOW TUBE, LINER, AND INTEGRATED INTERFACE FOR RECEIVING A HOUSING

(71) Applicant: Kamstrup A/S, Skanderborg (DK)

(72) Inventors: Peter Schmidt Laursen, Skanderborg (DK); Mads Andersen, Skanderborg (DK)

(73) Assignee: Kamstrup A/S, Skanderborg (DK)

( * ) Notice: Subject to any disclaimer, the term of this patent is extended or adjusted under 35 U.S.C. 154(b) by 276 days.

(21) Appl. No.: 17/607,453

(22) PCT Filed: May 1, 2020

(86) PCT No.: PCT/DK2020/050120
§ 371 (c)(1),
(2) Date: Oct. 29, 2021

(87) PCT Pub. No.: WO2020/224734
PCT Pub. Date: Nov. 12, 2020

(65) Prior Publication Data
US 2022/0214202 A1  Jul. 7, 2022

(30) Foreign Application Priority Data
May 3, 2019 (EP) .................................... 19172608

(51) Int. Cl.
*G01F 15/14*    (2006.01)
*G01F 1/66*     (2022.01)
*G01F 15/18*    (2006.01)

(52) U.S. Cl.
CPC .............. *G01F 15/14* (2013.01); *G01F 1/662* (2013.01); *G01F 15/18* (2013.01)

(58) Field of Classification Search
None
See application file for complete search history.

(56) References Cited

U.S. PATENT DOCUMENTS

| 5,406,854 A | * | 4/1995 | Wagner | ................... | G01F 1/663 |
| | | | | | 73/170.13 |
| 9,109,932 B2 | | 8/2015 | Voigt et al. | | |

(Continued)

FOREIGN PATENT DOCUMENTS

| CN | 104729602 A | 6/2015 |
| EP | 1039269 A1 | 9/2000 |

(Continued)

OTHER PUBLICATIONS

International Search Report and Written Opinion issued Jul. 24, 2020, for priority International Patent Application No. PCT/DK2020/050120.

(Continued)

*Primary Examiner* — Jamel E Williams
(74) *Attorney, Agent, or Firm* — Renner, Otto, Boisselle & Sklar, LLP

(57) ABSTRACT

An ultrasonic flow meter, comprising a flow tube with a through-going opening for passage of a fluid between an inlet and an outlet, comprising: a flow pipe of a first material, such as metal, extending between the inlet and the outlet, a liner of a second material, such as a polymer-based material, extending along an inner surface of the flow pipe between the inlet and the outlet, a housing providing a compartment for transducers and metering electronics wherein the housing is connected to the liner, by being mounted on an interface being an integrated part of the liner.

18 Claims, 8 Drawing Sheets

(56) References Cited

U.S. PATENT DOCUMENTS

| | | | |
|---|---|---|---|
| 9,297,681 | B2 | 3/2016 | Speidel |
| 10,704,941 | B2 | 7/2020 | Kuhlemann et al. |
| 2013/0031988 | A1* | 2/2013 | Drachmann ............ G01F 15/18 |
| | | | 73/861.18 |
| 2014/0216167 | A1* | 8/2014 | Nielsen .................... G01F 1/66 |
| | | | 73/861.28 |
| 2014/0318268 | A1* | 10/2014 | Sorensen ................ G01P 5/245 |
| | | | 73/861.27 |
| 2017/0314978 | A1 | 11/2017 | Drachmann |
| 2019/0072421 | A1* | 3/2019 | Drachmann ............ G01F 1/667 |
| 2019/0226893 | A1* | 7/2019 | Kuhlemann ............ G01F 1/662 |

FOREIGN PATENT DOCUMENTS

| | | |
|---|---|---|
| EP | 2278281 A1 | 1/2011 |
| EP | 2682719 A1 | 1/2014 |
| EP | 3427014 A1 | 1/2019 |
| WO | 2015000487 A1 | 1/2015 |
| WO | 2017152915 A1 | 9/2017 |
| WO | 2018011371 A1 | 1/2018 |
| WO | 2018011371 A9 | 3/2018 |
| WO | 2018011371 A4 | 4/2018 |
| WO | 2018206536 A1 | 11/2018 |

OTHER PUBLICATIONS

Office Action dated Apr. 3, 2024, for Chinese Patent Application No. 202080032652.7.

\* cited by examiner

FLOW METER WITH FLOW TUBE, LINER, AND INTEGRATED INTERFACE FOR RECEIVING A HOUSING

This application is a national phase of International Application No. PCT/DK2020/050120 filed May 1, 2020, which claims priority to European Patent Application No. 19172608.2 filed May 3, 2019, the entire disclosures of which are hereby incorporated by reference.

FIELD OF THE INVENTION

The present invention relates to an ultrasonic flow meter including a housing and a flow tube including an overmolded flow pipe.

BACKGROUND OF THE INVENTION

Ultrasonic flow meters utilize ultrasonic transducers to transmitting ultrasonic signals through a flow channel to measure flow rate. The operation of the ultrasonic transducers is controlled by an electronic circuit, electrically connected to the transducers. Flow meters may be used for measuring the flow rate and consumption of utilities such as water or district heating.

Different types of ultrasonic flow meters exist. Some are based on metal or brass flow tube and other are made exclusively from polymer. Metal flow tubes have the advantage of being strong and water-tight and may be used together with hot liquids. However, metal flow tube are also relatively expensive to produce and may include lead, which is often considered undesirably. Polymer-based flow tube on the other hand are usually cheaper but may suffer the disadvantage of not being as strong. Also, polymer flow tubes may have the effect that metal pipes of the water supply are isolated from one another, which may be undesirable as the metal pipes of a water supply are sometimes used as the earthing- or grounding system of electrical installations. Flow tubes based on a metal pipe having a coated inner surface are known, but flow meters based on such flow tubes are still expensive to produce especially due to the cost of the metal flow pipe.

Different ultrasonic flow meter concepts also exist in terms of how the transducers are mounted on the flow tube. Some meters are based on flow tubes provided with openings for receiving transducers whereas others use an unbroken flow tube with transducers mounted on an outer surface. However, meters with transducers mounted on an outer surface are especially meters with a small flow tube diameters in the range 5-15 millimetres (DN5-DN15), are only practically realisable when the flow tube is made from polymer. In such meters, ultrasonic signals are transmitted through the wall of the polymer flow tube, thereby eliminating any need for a sealing of the flow tube. For larger dimension flow meters, such as from DN10, DN25 to DN50 and larger the flow tube is typically made from a metal and has openings for the transducers. Especially flow meters with a metal flow tube may have a liner covering the inner surface of the metal flow pipe.

Flow meters does also have a housing for enclosing measurement circuits, batteries and optional also flow transducers. The housing must protect the elements enclosed by the housing form humidity especially water ingress into the housing must be prevented or minimized. The housing is often made from a polymer and ultrasonic signals may be transmitted through a wall of the housing into the flow tube. Polymers are open for water diffusion and water may diffuse through a polymer wall of the housing and may damage elements enclosed by the housing.

A need therefore exists for a flow meter including a flow tube providing the advantages of both metal and polymer flow tubes and which can be combined with a housing providing sufficient protection from water ingress.

SUMMARY OF THE INVENTION

It is an object of the invention to solve the abovementioned problems of the prior art and especially to provide a flow meter comprising a housing which prevents water ingress and a flow tube utilizing the advantages of both metal and polymer flow tubes, and which can be fabricated in a cost-efficient and versatile manner using materials. It is an further object to provide a flow meter having an extended lifetime by improved shielding of electronic components from the fluid measured and water in the surroundings and prevention of corrosion, hydrolysis and wear of the flow tube.

In accordance with a first aspect of the invention, an ultrasonic flow meter is provided. The flow meter comprising: a flow tube with a through-going opening for passage of a fluid between an inlet and an outlet, the flow tube comprising: a flow pipe of a metal material, extending between the inlet and the outlet; and a liner of a first polymer-based material, extending along an inner surface of the flow pipe between the inlet and the outlet, a housing providing a compartment for transducers and metering electronics, wherein the housing is connected to the liner by being mounted on an interface being an integrated part of the liner.

The present invention is advantageous in that the metal flow pipe provides mechanical stability and the polymer liner provides high resistance to hydrolysis and diffusion. Due to the increased mechanical stability provided by the metal flow pipe less filler may be provided in the polymer-based material for the liner. Also, by using a combination of a metal flow pipe providing strength and a polymer liner, the polymer-based material used for the liner may be made from a broader range of inexpensive polymers.

The liner protect the metal flow pipe from the fluid flowing in the flow tube, whereby corrosion of the flow pipe is prevented. At the same time metal from the flow pipe is prevented from being dissolved in the fluid flowing in the flow pipe.

The interface which is a part of the liner has the advantage that a separate prefabricated housing can be mounted on the polymer liner: No elements for mounting the housing is needed on the metal flow pipe. Further, the housing may be made from a different material than the liner including the interface, such a material may be a metal or a polymer. The polymer based material for the housing may be different from the polymer based material used for the liner. This has the advantage that different flow meters optimized for measuring different fluids under different conditions may be provided from a collection of different prefabricated flow tubes and housings.

As an example it may be advantageous to make the housing from a polymer based material being more resistive to diffusion of water whereby the elements enclosed by the housing is better protected. It is to be noted that water diffusing into the housing is not limited to water flowing in the flow tube but water in the surroundings of the housing will also diffuse through the wall of an diffusion open meter housing. Flow meters such as water meters may be submerged or water may condense on an outer surface of the meter.

In the context of the present invention the liner is to be understood as a cover of the inner surface of the flow tube, which would otherwise be exposed to the fluid. The interface is an integrated part of the liner and is as such to be understood as a part of the liner.

The flow pipe may be made of brass, steel, stainless steel, cast iron, aluminium or any other suitable metal or alloy and the liner may be made from a polymer based material including a polymer and a filler.

A polymer based material comprising a filler is also called a composite. In the context of the invention a polymer based material or simply a polymer is to be construed as including a composition of one or more polymers and optionally one or more fillers.

Polymers and composite material based thereupon have varying resistance towards diffusion and hydrolysis depending on the nature of the functional groups making up the backbone of the polymer, and on the amount of any filler used therein. Adding a filler like carbon fibres to a polymer structure to improve its mechanical stability tends to reduce its stability to diffusion and hydrolysis. Thus, by adding a filler to the polymer structure, and even to a polymer structure which is otherwise considered watertight, provides access routes for water into the structure on the microscopic or even atomic level, thereby promoting hydrolysis and diffusion processes.

The flow tube with the flow pipe and liner of the present invention addresses this problem by the metal flow pipe providing mechanical stability and the polymer liner providing high resistance to hydrolysis and diffusion as less filler may be provided in the polymer-based material. Also, by using a combination of a metal flow pipe providing strength and a polymer liner, the polymer-based material used for the liner may be made from a broader range of inexpensive polymers.

The polymer-based material for the liner may comprises a filler in a w/w ratio in the range of 1-20%, 1-10%, or 1-5%. Such small relative amounts of filler provide excellent mechanical and chemical properties of the liner material.

The liner may be provided in thermoplastic materials so that they may be fabricated by injection molding, and wherein the flow pipe is molded onto the liner to create the flow tube.

Thus a flow meter may be obtained in an in-expensive manner which by proper choice of first polymer based material is sufficiently strong for handling and use.

By applying such so-called overmolding, the flow tube may be manufactured in a very cost-efficient manner. The interface being an integrated part of the liner has the advantage of simplifying production as the interface may be provided in the same overmolding process as the liner which reduces production costs.

The first polymer-based material may be based on one or more of the polymers: polypropylene, PP; polycaprolactam, PA6; polyethylene, PE; Cross-linked polyethylene, PEX. These polymers have the advantage of a low cost and being easy to use in an overmolding process. However they do not have high mechanical strength and are to a some degree diffusion open to water. The first polymer-based material may be a composite reinforced by one or more of the following fillers: graphite, carbon, carbon fibers, glass fibers and metal powder. The filler increases mechanical strength but does also decrease resistance to diffusion.

The flow meter may have a housing made of a second polymer-based material different from the first polymer-based material. Since the housing is not an integrated part of the liner it may be produced in a separate molding process using other materials and processes than used for producing the liner. It is thus advantageous to have a flow meter with a housing made from a second polymer-based material. It is especially advantageous to provide a housing made from PPS. PPS has the advantage of having high resistance to diffusion of water and high mechanical strength, however, being more expensive than PP, PA6, PE or PEX. So, a flow meter comprising the combination of a liner made from a first polymer based material comprising one or more of PP, PA6, PE or PEX and a housing made from a second polymer based material comprising PPS provides an optimized solution where cost is reduced for the liner by using PP, PA6, PE or PEX and the housing is optimized with respect to strength and minimizing water ingress into the housing by using PPS.

The second polymer-based material may be a composite reinforced by one or more of the following fillers: graphite, carbon, carbon fibers, glass fibers and metal powder. Especially PPS combined with the mentioned fillers has shown to be very resistive to water diffusion. Such a flow meter may especially be advantageous for use as a water meter which may be submerged or subject to condensation of water on surfaces of the meter. The combination may also be advantageous for a cooling meter which also may experience water condensing on its outer surfaces.

For a heat meter the composition of materials may be different in that the liner needs to be suitable for hot fluids which may also comprise some chemicals whereas a heat meter is not submerged and is unlikely to be subject to condensation of water so water tightness of the housing is less critical. Thus, a heat meter with a liner made from a polymer based on one or more of PES, PSU, PPSU and a housing made from a polymer based on PA12, PPA or alternatively PPS may be advantageous in that PES, PSU, PPSU are suitable for protecting the flow pipe from the warm fluid flowing in a heating system and especially PA12 and PPA are low cost polymers having a lower cost than polymers used for the liner.

For flow meters intended for measuring flow of fluids comprising more aggressive chemicals the composition of materials may be different in that the liner need suitable for protecting the flow pipe from the more aggressive chemicals. Thus, a flow meter with a liner made from a polymer based on PEEK, PEKK or PEK and a housing made from a polymer based on PA12, PPA or alternatively PPS may be advantageous in that PEEK, PEKK or PEK can resist aggressive chemicals and especially PA12 and PPA are low cost polymers having a lower cost than polymers used for the liner.

The liner may have sound absorbing properties and/or having an acoustic impedance which will deflect the ultrasonic waves whereby undesired reflections are minimized and measurement accuracy is increased. For selection of liner materials with such properties reference is made to EP 1 387 149 A1.

The liner may comprise a sealing surface arranged at the inlet and the outlet of the flow tube. To increase the area of the sealing surface it may be advantageous if the liner and the flow pipe each have a conical shape at the inlet and the outlet. The conical shape is made on the inner surface of the flow pipe. When the flow pipe is overmolded the liner will have a conical shape where it meets the conical inner surface of the flow pipe. This has the advantage of increasing the sealing surface without decreasing the cross sectional area of the flow channel. Further, the conical shape supports liner to prevent it from being pressed back into the flow tube. The very thin wall of the flow pipe close to the pipe ending has the advantage that the liner-metal junction will be moved towards the periphery of the flow tube, whereby it is protected from the mechanical forces of the fluid flowing in the flow tube which prevents delamination of the flow tube caused by the fluid being pressed in between the liner and the flow pipe.

In a second aspect of the invention a method of fabricating a flow meter according to the first aspect, the method comprising the steps of: providing a metal flow pipe comprising one or more openings and a conical shaped inner surface at the inlet and outlet; arranging the flow pipe in an injection mold of a machine for overmolding; injecting a polymer-based material into the injection mold to create a flow tube according to the invention, including a liner with an integrated interface; and mounting a housing on the interface of the liner.

The production method is especially advantageous in that the overmolding process is simplified by simply molding an interface for the housing and not molding the housing as an integrated part of the liner. Further the conical shaped inner surface of the flow pipe has the advantage of reducing mechanical stresses in the flow tube due to shrinkage of the liner when cooling down.

The polymer of the polymer-based material for the liner may be selected from the group consisting of polysulphone (PSU), polyethersulphone (PES), polyphenylethersulphone (PPSU), polyphenylenesulphide (PPS), polyetherketone (PEK), polyetheretherketone (PEEK), polyetherketoneketone (PEKK), polypropylene (PP) and polycaprolactam (PA6). Alternatively, if more strength is desired in the liner, the polymer may be selected from the group consisting of polysulphone (PSU), polyethersulphone (PES), polyphenylenesulphide (PPS), polystyrene (PS), Polyphthalamide (PPA) and polyamide (PA), in particular polyamide 12 (PA12) from 1,12-dodecandioic acid.

The polymer based material for the housing may also be selected from the above mentioned group of polymers, especially PPS, PA12 and PPA may be advantageous for the housing.

Polysulphones are defined as polymers wherein sulphone groups (—S(O2)—) make up part of the backbone structure of the polymer. Examples include but are not limited to polysulphone (PSU) polyphenylethersulphone (PPSU), and polyethersulphone (PES).

Polysulphides are defined as polymers wherein sulphide groups (—S—) make up part of the backbone structure of the polymer. An example hereof is polyphenylene sulphide (PPS).

Polyaryletherketones are defined as polymers wherein combinations of ether groups (—O—) and ketone groups (—C(O)—) make up part of the backbone structure of the polymer. Examples include but are not limited to polyetherketone (PEK), polyetheretherketone (PEEK), and polyetherketoneketone (PEKK).

The filler material for both the liner and the housing may be selected from the group consisting of graphite, carbon, carbon fibers, glass fibers and metal powder. The filler material constitutes a reinforcing agent and provides mechanical stability to the line and housing, respectively.

The flow meter may be a consumption meter or utility meter, e.g. a water meter for cold and/or hot water, gas meter, heat meter, cooling meter, energy meter or smart meter.

The consumption meter may be used in connection with district heating, district cooling and/or distributed water supply.

The consumption meter may be a legal meter, i.e. a meter which is subdued to regulatory demands. Such regulatory demands may be demands to the precision of the measurements.

Further advantageous embodiments of the first and second aspects are disclosed in the description of the embodiments.

In general the aspects of the invention may be combined and coupled in any way possible within the scope of the invention. These and other aspects, features and/or advantages of the invention will be apparent from and elucidated with reference to the embodiments described hereinafter.

Although the present invention has been described in connection with the specified embodiments, it should not be construed as being in any way limited to the presented examples. The scope of the present invention is to be interpreted in the light of the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

BRIEF DESCRIPTION OF THE DRAWINGS

Embodiments of the invention will be described, by way of example only, with reference to the drawings, in which.

DESCRIPTION OF EMBODIMENTS

Figure 1:
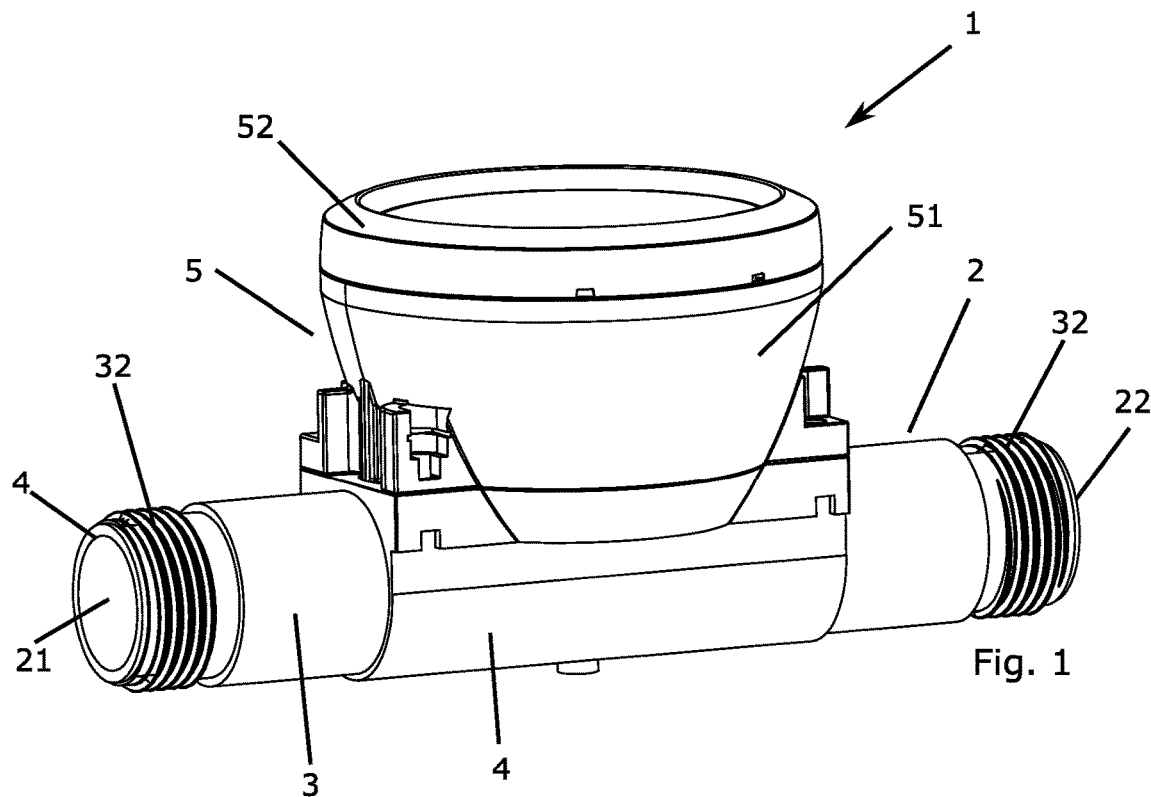
FIG. 1 illustrates an embodiment of an ultrasonic flow meter including a housing mounted on an interface of the liner of the flow tube.
Figure 2:
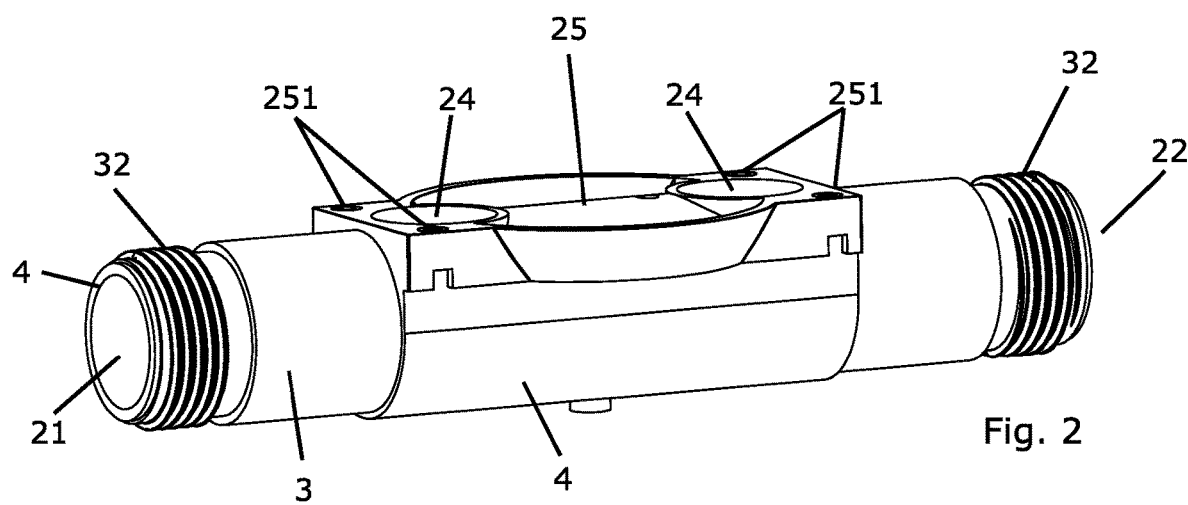
FIG. 2 illustrates a flow tube including a flow pipe and a liner providing an interface for mounting a housing.
Figure 3:
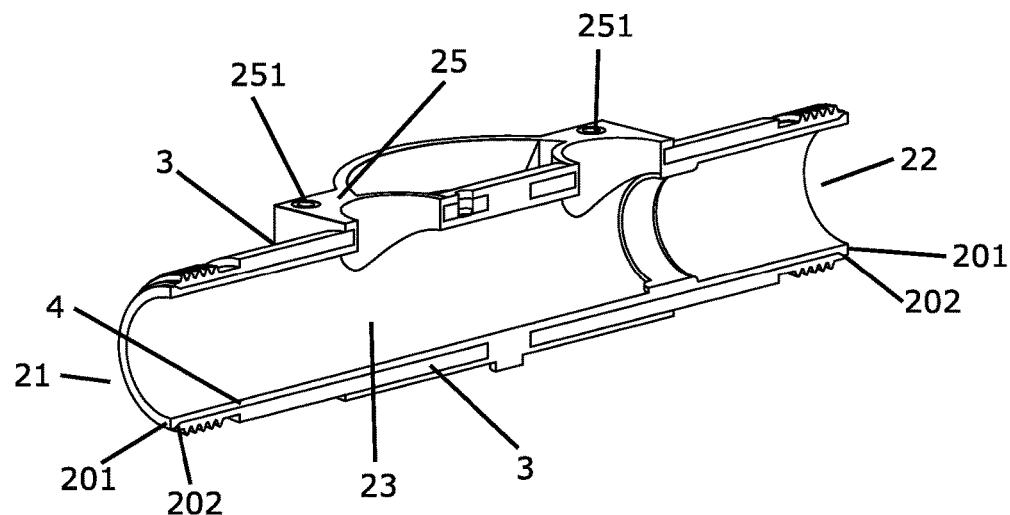
FIG. 3 shows a cross section of the flow tube of FIG. 2.

Referring to FIG. 1, FIG. 2 and FIG. 3, a flow meter 1 comprising a housing 5 mounted on a flow tube 2 is shown. The flow tube 2 comprises a through-going opening for passage of a fluid between an inlet 21 and an outlet 22. The through-going opening is also referred to as a flow channel 23. The flow tube further includes an interface 25 for mounting the housing 5. The interface is provided with two through-going openings 24 arrange to be aligned with transducers of an ultrasonic flow meter arranged inside the housing.

Figure 5:
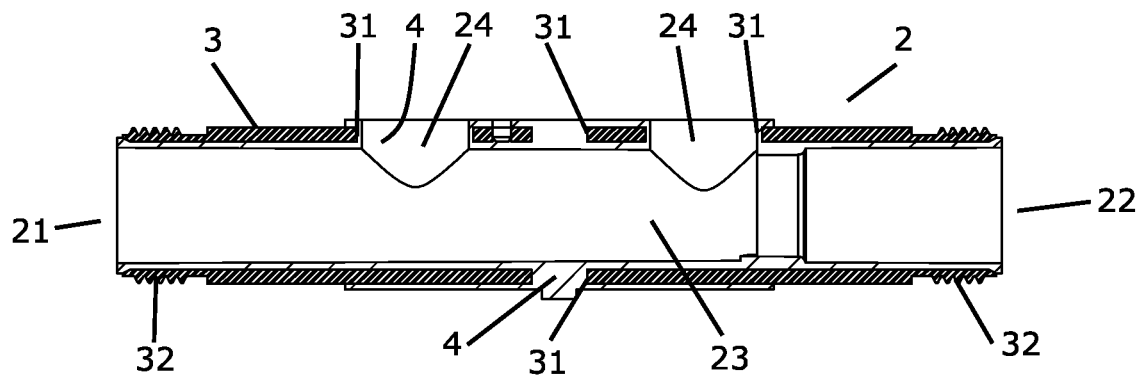
FIG. 5 is another illustration of a cross section of the flow tube of FIG. 2.

The flow tube 2 comprises a flow pipe 3 and liner 4 extending along an inner surface of the flow pipe. The flow pipe is made from a metal material such as steel, stainless steel, cast iron, aluminium or brass and comprises a plurality of through-going openings 31 as best seen from FIG. 5 and FIG. 6. The flow pipe may be cast or made from a standard length of pipe machined to include the shown openings, threads and other geometries. The flow pipe may comprise threads 32 or flanges (not shown) for connecting the flow tube to connecting pipes of water distribution system.

The liner is cast or molded, such as through known overmodling processes, around the flow pipe to cover an inside surface of the flow pipe and provide the interface 25 for mounting the housing 5 on a outer surface of the flow pipe. The overmolding cover at least parts of the outer surface of the flow pipe. The interface may be provided with threads 251 for mounting the housing. Such threads may be provided by metal elements molded into the interface. The interface 25 is an integrated part of the liner 4 and is made from the same material as the liner. The interface may be molded in one overmolding process together with the rest of the liner. The liner 4, including the interface 25, extends from the inner surface of the flow pipe 3 through one or more holes 31 in the flow pipe to the outer side of the flow pipe, where the interface 25 is arranged and is an integrated part of the liner. The interface comprises one or more surfaces for arranging sealing means such as O-rings or gaskets (not shown) between the housing and the interface. The sealing means may preferably be arranged around the two through going openings 24 provided in the interface. The two through going openings in the interface extends through the liner and holes 31 in the flow pipe whereby direct access to the flow channel 23 is possible from the interface 25. When the housing is mounted on the interface it has direct contact to the flow channel and the fluid flowing in the flow channel. The sealing means between the housing 5 and the interface 25 are arranged to prevent fluid from escaping the flow tube.

Figure 13A:
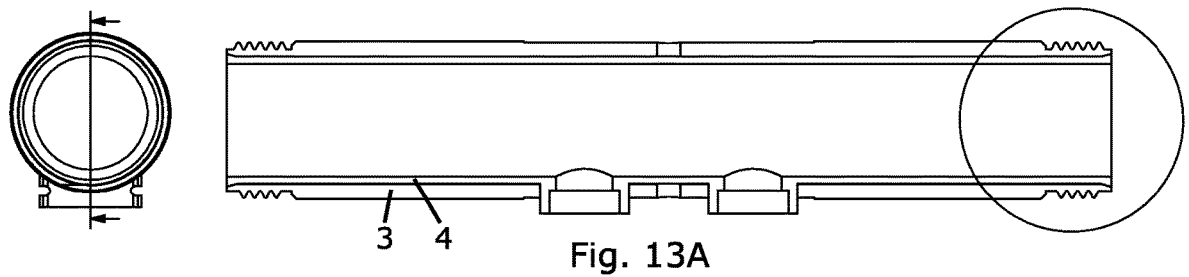
FIG. 13A shows a cross section of a flow tube with a conical shaped Inner surface at the flow pipe endings at the inlet and the outlet of the flow tube and a liner creating a sealing surface at the inlet and the outlet of the flow tube.
Figure 13B:
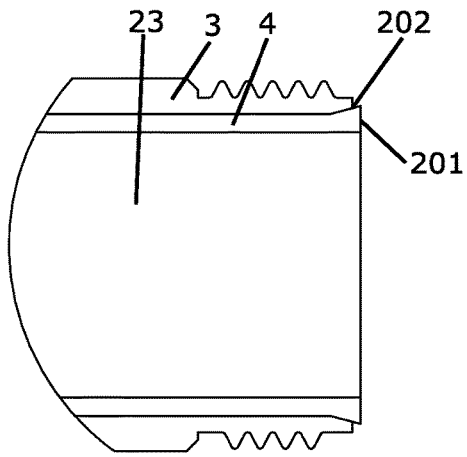
FIG. 13B shows a scale up of the inlet/outlet of the flow tube of FIG. 13A, where the liner has not cooled down after overmolding and no shrinkage has occurred yet.
Figure 13C:
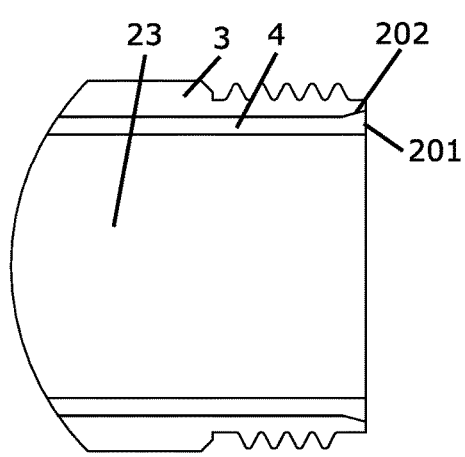
FIG. 13C shows a scale up of the inlet/outlet of the flow tube of FIG. 13A, where the liner has cooled down after overmolding and shrinkage has occurred without creating mechanical stresses in the flow tube or deformation of the liner.

In the shown embodiment, the liner provides a water-tight membrane and completely covers the inside surface of the flow pipe. Hereby, fluid flowing through the flow tube does not come into contact with the flow pipe. The liner protects the flow pipe from the fluid flowing in the flow tube and prevents corrosion of the flow pipe. Further the liner prevents that metal from the flow pipe is dissolved in the fluid. However, metal pipes possible used in a water supply wherein the flow meter is installed may be connected to the metal flow pipe via threads 32. In this way an electric connection of pipes at each side of the flow meter is achieved. In some installations an Galvanic isolation is undesired. In another embodiment the liner may be configured to only cover part of the flow pipe. The liner may be arranged at the inlet and the outlet to create a sealing surface used for sealing the connection to pipes of the water supply wherein the flow meter is installed as illustrated in FIG. 13A-13C.

The liner, including the interface, is made from a polymer based material. The polymer based material may be a composite comprising a filler, which increases the strength of the polymer based material. polypropylene (PP), polycaprolactam (PA6), polyethylene (PE) and Cross-linked polyethylene (PEX) are preferred polymers for the liner as they are inexpensive and are easy to use in an over molding process. The liner may comprise one or more of these polymers.

The housing 5 is mounted on the interface 25 as described above. The housing includes a cup-like element 51 provided with a lid 52. The lid may be provided with a transparent window. The housing is adapted to contain electrical components of an ultrasonic flow meter including piezoelectric transducers, a control circuit provided on a printed circuit board (PCB), a communication device for radio frequency communication, a battery-pack providing a power source, the housing may further contain a display visible through the transparent window and other elements. The transducers are arranged inside the housing to transmit ultrasonic signals through the flow channel to generate a signal or value indicative of a flow rate of a fluid flowing through the flow tube. The transducers arranged inside the housing are in contact with the fluid in the flow tube through a wall of the housing and the through going openings in the interface, whereby ultrasonic signals can be transmitted and received through the fluid inside the flow tube.

The housing is adapted to keep water away from the components contained inside the housing. Sealing means are provided between the lid and the cup. The housing is made from a polymer based material. The polymer based material may be a composite comprising a filler to increase the strength of the polymer. Polymers are diffusion open to water. A desiccant may be contained inside the housing to absorb water diffusing from the outside through the wall of the housing to the inside of the housing. Polymers based on polyphenylenesulphide (PPS) are less diffusion open and possess mechanical properties making the suitable for making the housing. PPS is a preferred polymer material for the housing.

The filler material for both the liner and the housing may be selected from the group consisting of graphite, carbon, carbon fibers, glass fibers and metal powder. The filler material constitutes a reinforcing agent and provides mechanical stability to the line and housing, respectively.

Figure 4:
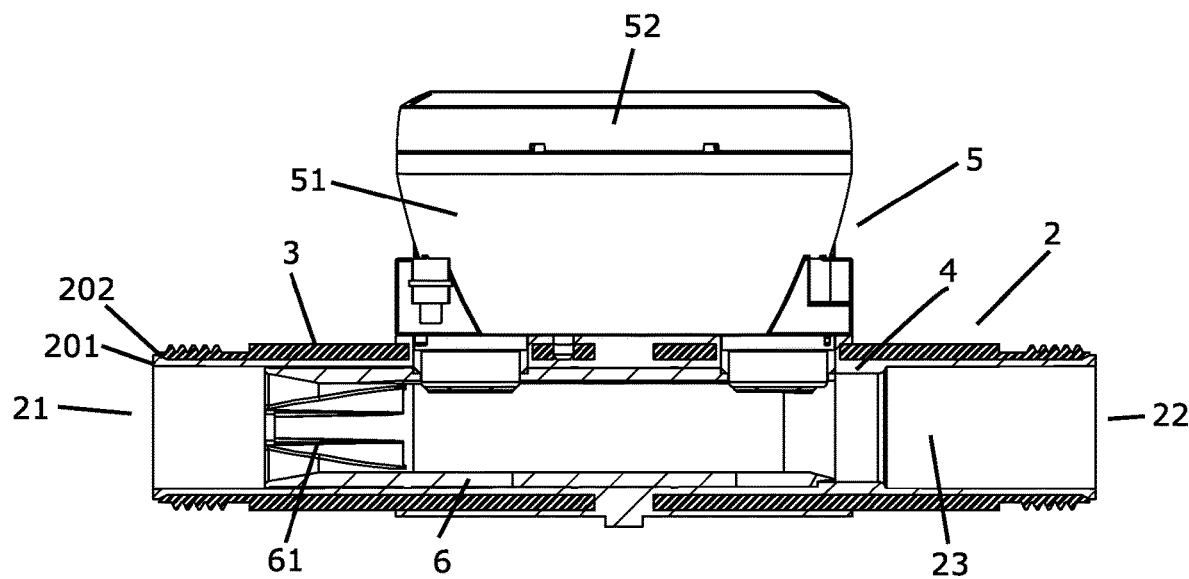
FIG. 4 shows a cross section of the flow meter of FIG. 1, including a measuring pipe inside the flow tube.
Figure 14:
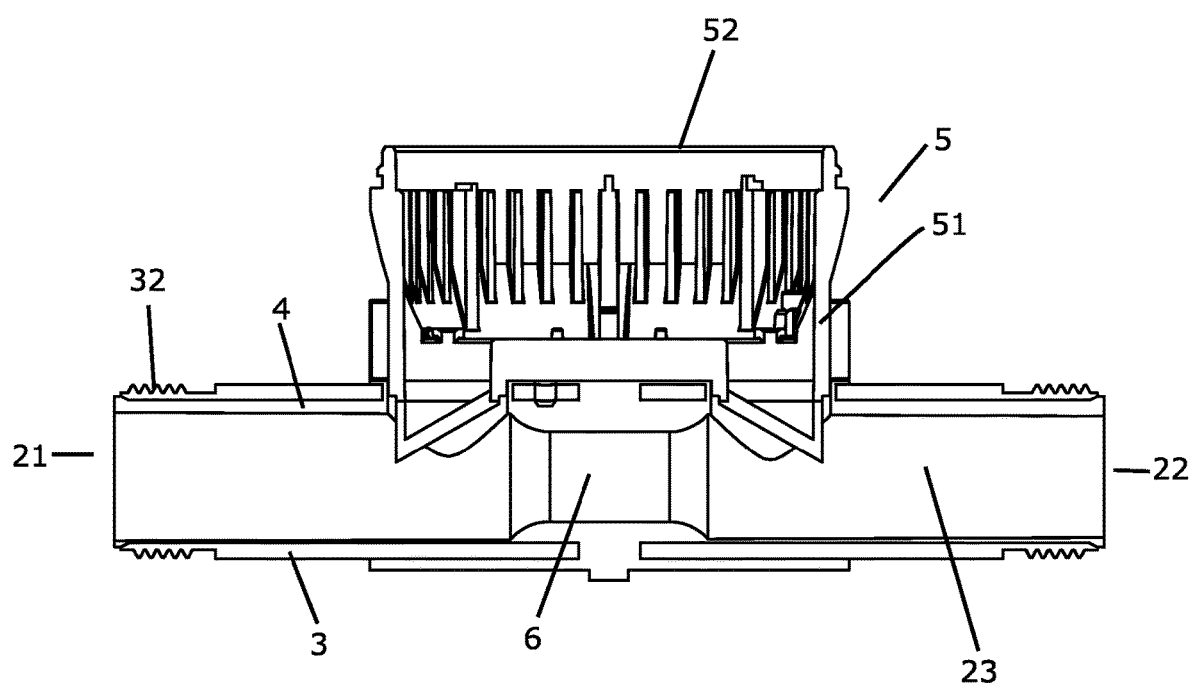
FIG. 14 shows a cross section of a flow meter with a housing, a flow tube and a measuring pipe.

In FIG. 4 and FIG. 14, the flow meter is shown to include a measuring pipe 6 arranged in the flow channel. The liner may be provided with recesses or protrusions for fixating the measuring pipe inside the flow tube. As an alternative the liner may also provide the measuring pipe in that the measuring pipe is moulded as an integrated part of the liner.

The measuring pipe may include a flow straightener 61 provided to condition fluid flowing through the flow tube, e.g. to reduces swivels, asymmetric flow profiles or other inadvertent flow characteristics. The liner may be provided with recesses or protrusions for fixating the flow straightener inside the flow tube.

The flow meter may also include a flow insert (not shown) comprising two or more reflectors arranged in the flow channel to directing an ultrasonic signal from an emitting piezoelectric transducer to a receiving piezoelectric transducer in a manner so that the ultrasonic signal propagates parallel with the direction of the flow tube, i.e. parallel with a centre axis of the flow tube. As an alternative to the flow insert the reflectors may be overmolded by the liner or molded into the liner. As yet another alternative the reflectors may be left out and the ultrasonic signals may be reflected by the metal wall of the flow pipe. If reflectors are left out it may be advantageous to angle the ultrasonic transducer in an oblique angle related to the longitudinal direction of the flow tube. This is illustrated in FIG. 14.

Figure 7:
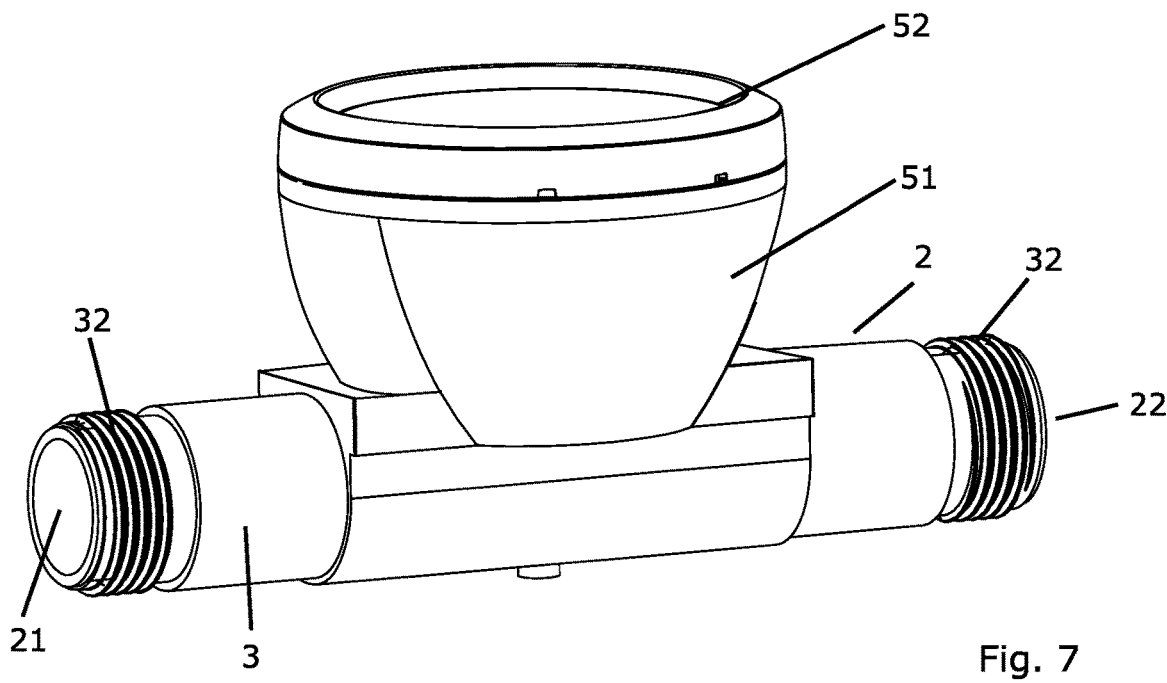
FIG. 7 illustrates an embodiment of an ultrasonic flow meter including a housing made as an integrated part of the liner.
Figure 8:
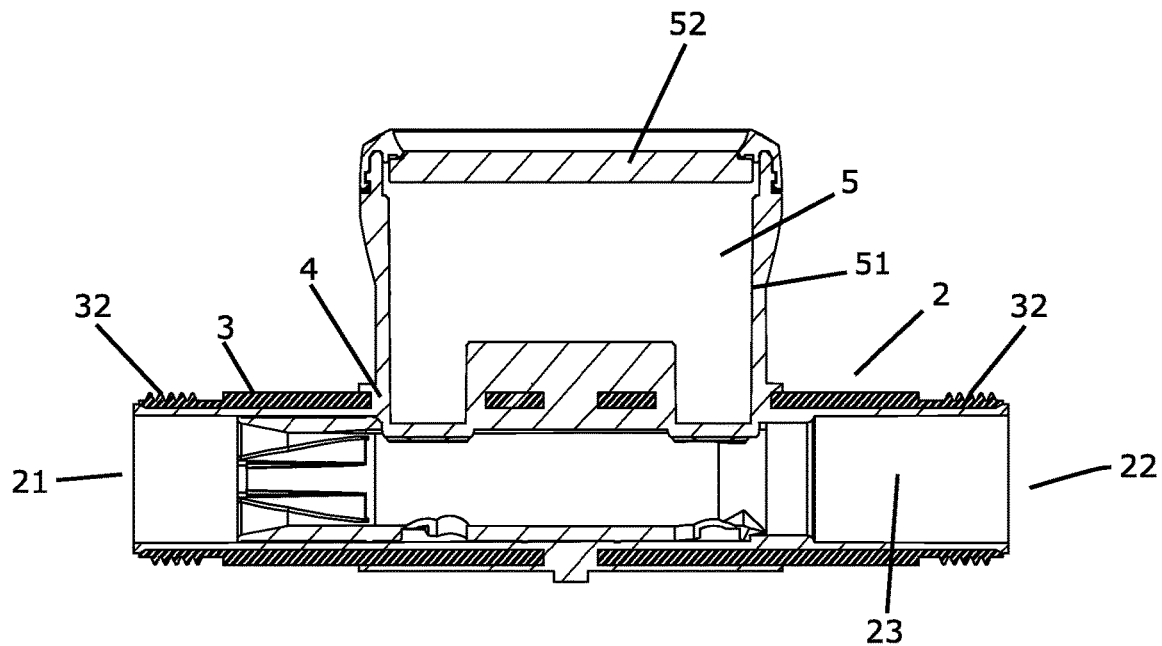
FIG. 8 shows a cross section of the flow meter of FIG. 7.

Referring to FIG. 7 and FIG. 8 another embodiment of a flow meter is shown. In this embodiment the housing 5 in made as an integral part of the liner 4, i.e. the liner is monolithically formed with the housing. The liner thus does not provide an interface 25 for mounting the housing. With the housing being made as an integral part of the liner, no openings are provided in the flow tube except for the inlet 21 and outlet 22.

Figure 9:
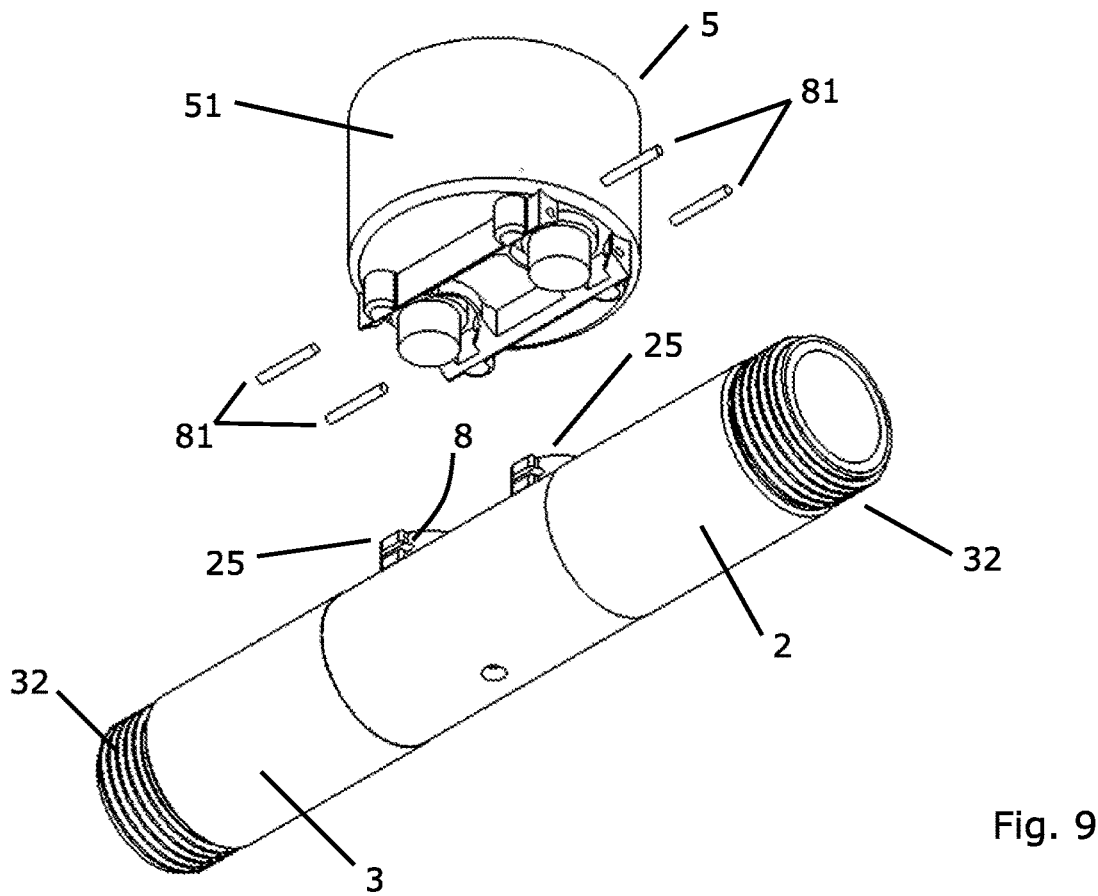
FIG. 9 illustrates another embodiment of an ultrasonic flow meter including a housing mounted on an interface of the liner of the flow tube.
Figure 10:
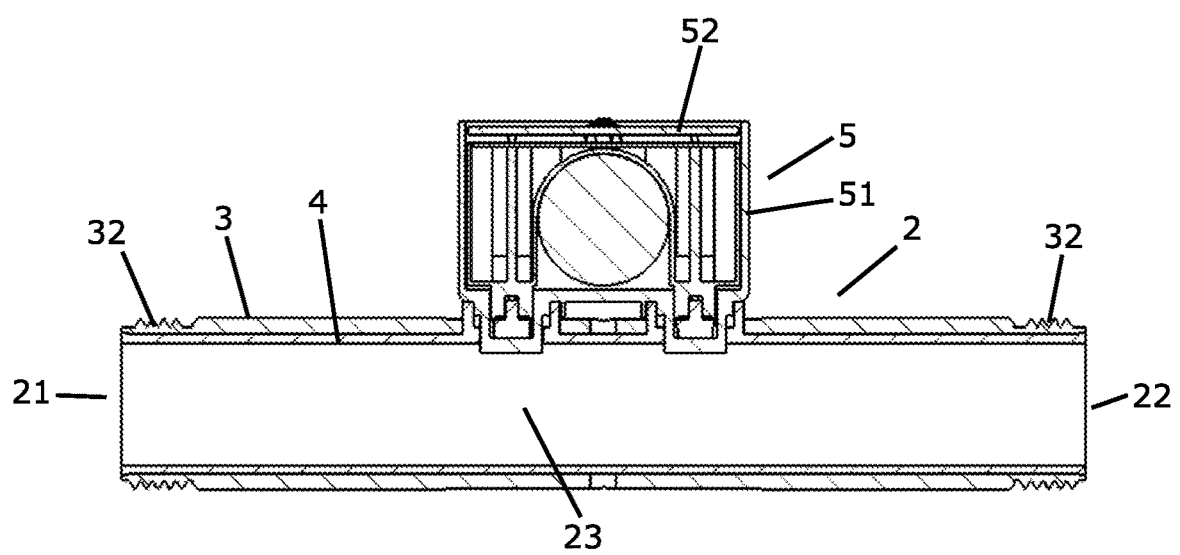
FIG. 10 shows a cross section of the flow meter of FIG. 9 in a longitudinal direction and FIG. 11 shows a cross section of the flow meter of FIG. 9 in a transversal direction.
Figure 11:
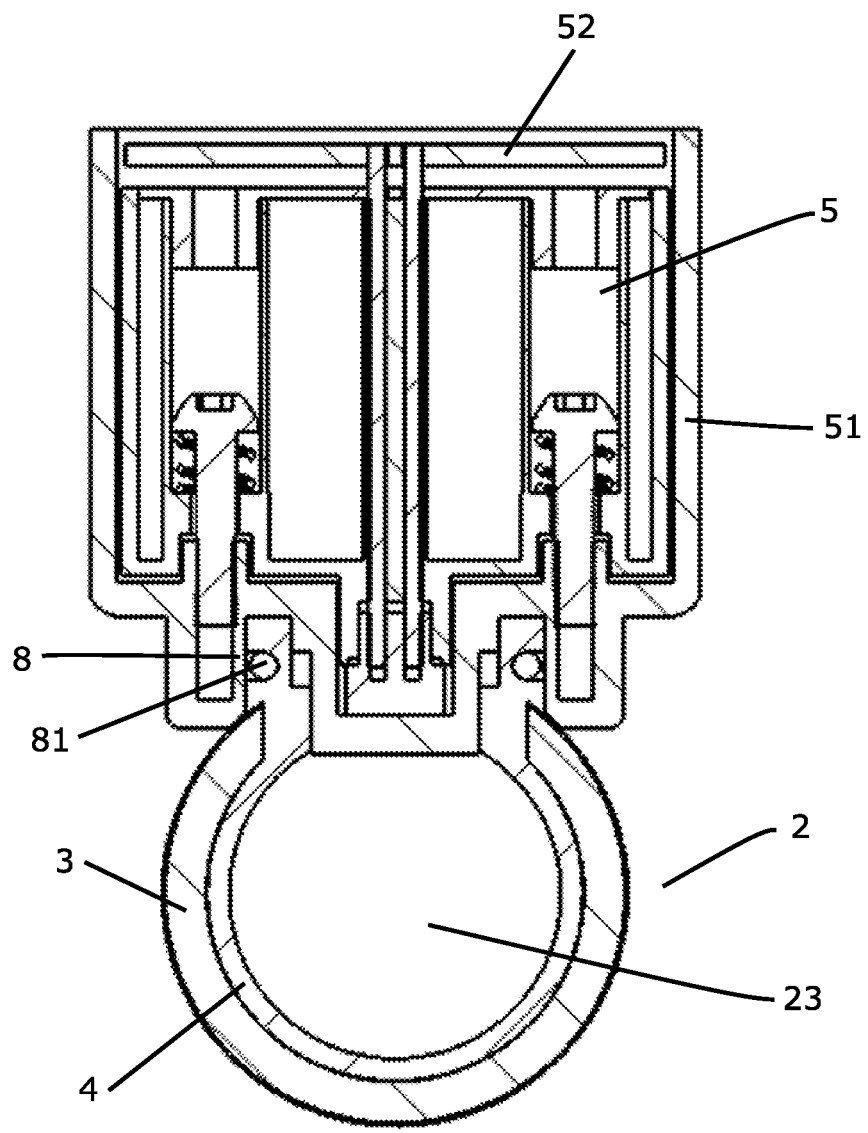

FIG. 9-11 illustrates another embodiment of an ultrasonic flow meter wherein the housing is connected to the interfaces of the liner and kept in place by a locking mechanism 8. The locking mechanism includes a number of locking pins 81 adapted to be received in openings in the liner interface. When the housing is mounted on the interface 25 of the liner the locking pins extends through the openings in the liner and openings in the housing whereby the housing is locked to the interface of the liner. As an alternative the housing 5 may be locked to the interface by use of screws extending through holes in the housing into holes 251 in the interface.

The flow meter may advantageously be an ultrasonic flow meter, such as a transit time flow meter arranged to measure a flow rate of a fluid flowing in the flow channel 23 by use of known operation principles for transit time flow meters, i.e. where ultrasonic signals are emitted by one transducer and received by the other transducer, and where the difference in time-of-arrival between oppositely propagating signals is measured and converted into a flow rate.

Figure 6:
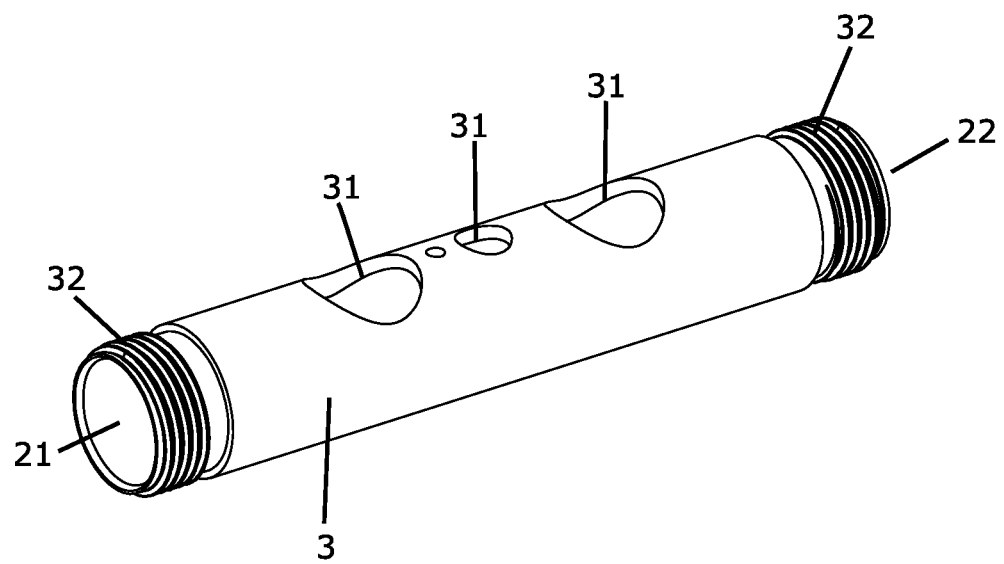
FIG. 6 shows a flow pipe.

Above described flow tubes are advantageously manufactured based on flow pipes made from standard pipe, such as an extruded pipe, a seam less pipe or a welded pipe. The standard pipe is cut and machined into a flow pipe as shown in FIG. 6, including threads and a plurality of openings. The flow pipe is prepared for overmolding and arranged in an injection mold designed for overmolding. Preparing the pipe for overmolding may include oner or more steps of heating the pipe, cleaning the pipe, sandblasting the pipe coating or in other way surface-treating the pipe especially to improve adherence of the liner. The liner is made by injection molding and the melt is injected into the mold and into the flow pipe via the through-going opening 31 provided in the lower wall of the flow pipe. In another embodiment other or multiple openings may be used for injecting the melt into the flow pipe. The mold is designed with one or more internal cores such that the flow channel 23 is provided. In one embodiment the mold is designed so that the interface 25 for mounting a housing is created as an integrated part of the liner. In other embodiments, the mold is designed such that the liner and housing are made as an integrated part. The liner possibly including the housing is thus molded onto the flow pipe.

Figure 12A:
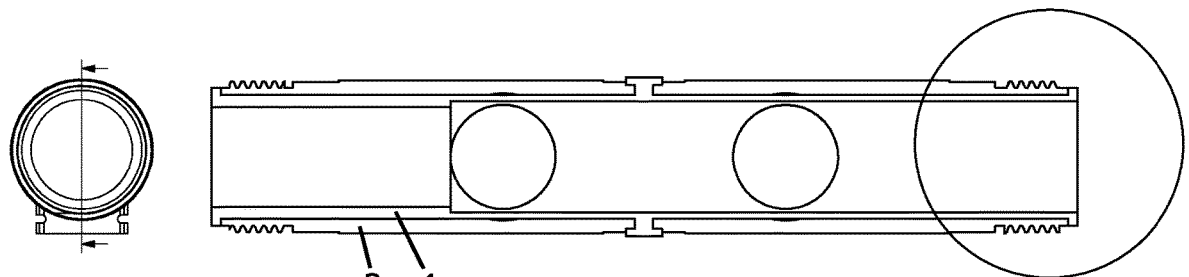
FIG. 12A shows a cross section of a flow tube with a liner creating a sealing surface at the inlet and the outlet of the flow tube.
Figure 12B:
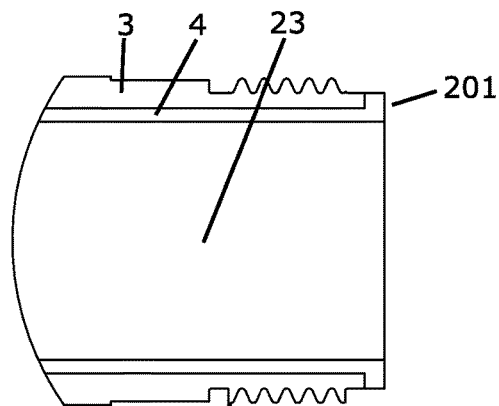
FIG. 12B shows a scale up of the inlet/outlet of the flow tube of FIG. 12A, where the liner has not cooled down after overmolding and no shrinkage has occurred yet.
Figure 12C:
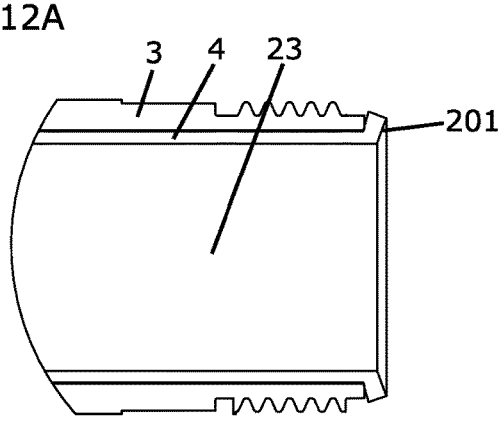
FIG. 12C shows a scale up of the inlet/outlet of the flow tube of FIG. 12A, where the liner has cooled down after overmolding and shrinkage has occurred creating mechanical stresses in the flow tube and deformation of the liner.

The liner is arranged to create a sealing surface 201 at the inlet and the outlet of the flow tube, this is illustrated in FIGS. 12-13. The sealing surface must be aligned with the end of the flow pipe and have a surface area large enough to provide sufficient sealing when pressed directly against the end a connecting pipe or compressing sealing means between the sealing surface and the end of a connecting pipe. To increase the surface area of the sealing surface the dimension of the flow pipe is reduced at the pipe endings to create an enlarged sealing surface 201 area without decreasing the cross sectional area of the flow channel 23. The liner is overmolded onto the flow pipe and will shrink when cooled down. If the liner extends around the end of the flow pipe, FIG. 12B or around a sharp edge at each end of the flow, pipe stresses may be created in the flow tube when the liner cools down and stiffens, FIG. 12C. To avoid such stresses the flow pipe and the liner may each have a conical shaped surface 202 facing each other at the inlet and the outlet of the flow tube whereby a sealing surface with an increased surface area may be created in an overmolding process without creating stresses in the flow tube, FIGS. 13B and 13C. Especially the flow pipe may have a conical shaped inner surface and the pipe endings at the inlet and the outlet of the flow tube. The conical shape will have the effect that when the liner cools down stiffens and shrinks during the overmolding process it will slide into the flow pipe and align with the pipe ending without mechanical stresses are created in the flow tube.

Although the present invention has been described in connection with the specified embodiments, it should not be construed as being in any way limited to the presented examples. The invention can be implemented by any suitable means; and the scope of the present invention is to be interpreted in the light of the accompanying claim set. Any reference signs in the claims should not be construed as limiting the scope.

The invention claimed is:

1. An ultrasonic flow meter comprising:
   a flow tube with a through-going opening for passage of a fluid between an inlet and an outlet, the flow tube comprising:
   a flow pipe of a metal material, extending between the inlet and the outlet; and
   a liner of a first polymer-based material, extending along an inner surface of the flow pipe between the inlet and the outlet, and
   a housing providing a compartment for transducers and metering electronics,
   wherein the housing is connected to the liner by being mounted on an interface being an integrated part of the liner.

2. A flow meter according to claim 1, wherein the first polymer-based material is based on one or more of the polymers: polypropylene, PP; polycaprolactam, PA6; polyethylene, PE; Cross-linked polyethylene, PEX.

3. A flow meter according to claim 1, wherein the first polymer-based material is a composite reinforced by one or more of the following fillers: graphite, carbon, carbon fibers, glass fibers and metal powder.

4. A flow meter according to claim 1, wherein the housing is made of a second polymer-based material different from the first polymer-based material.

5. A flow meter according to claim 4, wherein the second polymer-based material comprises PPS.

6. A flow meter according to claim 4, wherein the second polymer-based material is a composite reinforced by one or more of the following fillers: graphite, carbon, carbon fibers, glass fibers and metal powder.

7. A flow meter according to claim 1 wherein, the interface, which is an integrated part of the liner, comprises threads for mounting the housing.

8. A flow meter according to claim 7, wherein the threads is provided by metal elements molded into the interface.

9. A flow meter according to claim 1 wherein, the housing is locked to the interface, which is an integrated part of the liner, by one or more locking pins received in openings in the interface.

10. A flow meter according to claim 1 wherein one or more sealing means are arranged between the interface, which is an integrated part of the liner, and the housing.

11. A flow meter according to claim 1 wherein the liner comprises a sealing surface arranged at the inlet and the outlet of the flow tube.

12. A flow meter according to claim 11, wherein the liner and the flow pipe each have a conical shape at the inlet and the outlet of the flow tube.

13. A flow meter according to claim 1 wherein the first polymer based material comprises one or more polymers selected from the group of: PES, PSU, PPSU and wherein the second polymer based material comprises one or more polymers selected from the group of: PA12, PPA, PPS.

14. A flow meter according to claim 1 wherein the first polymer based material comprises one or more polymers selected from the group of PEEK, PEKK, PEK and wherein the second polymer based material comprises one or more polymers selected from the group of PA12, PPA, PPS.

15. A method of fabricating a flow meter according to claim 1, the method comprising the steps of:
providing a metal pipe comprising one or more openings and a conical shaped inner surface at the inlet and outlet;
arranging the metal pipe in an injection mold of a machine for overmolding;
injecting a polymer-based material into the injection mold to create the flow tube, including forming on the metal pipe a liner with an integrated interface; and
mounting the housing on the interface of the liner.

16. A flow meter according to claim 1, wherein the liner is a cover of the inner surface of the flow tube, which would otherwise be exposed to the fluid.

17. A flow meter according to claim 1, wherein the liner extends from the inner surface of the flow pipe through one or more holes in the flow pipe to the outer side of the flow pipe.

18. A flow meter according to claim 1, wherein the housing is directly connected to the interface of the liner.

* * * * *